United States Patent [19]
Wendt

[11] 3,989,398
[45] Nov. 2, 1976

[54] CLIP-ON ATTACHMENT MEMBERS FOR STRUCTURAL STEEL JOISTS

[75] Inventor: Alan C. Wendt, Barrington, Ill.

[73] Assignee: United States Gypsum Company, Chicago, Ill.

[22] Filed: Jan. 6, 1975

[21] Appl. No.: 538,692

[52] U.S. Cl................................ 403/232; 52/751
[51] Int. Cl.² .......................................... F16B 5/00
[58] Field of Search ........... 403/232, 230, 187, 189, 403/262, 190, 13, 14; 52/484, 751, 760, 714, 715, 665; 248/226 E

[56] References Cited
UNITED STATES PATENTS

| | | | |
|---|---|---|---|
| 1,780,707 | 11/1930 | Halsey | 52/484 X |
| 3,352,071 | 11/1967 | Sutter | 52/484 |
| 3,711,137 | 1/1973 | Tinnerman | 52/714 X |
| 3,798,865 | 3/1974 | Curtis | 52/665 |

FOREIGN PATENTS OR APPLICATIONS

| | | | |
|---|---|---|---|
| 923,119 | 4/1963 | United Kingdom | 403/187 |
| 994,701 | 6/1965 | United Kingdom | 403/187 |
| 185,694 | 9/1922 | United Kingdom | 52/751 |

*Primary Examiner*—Andrew V. Kundrat
*Attorney, Agent, or Firm*—Donnie Rudd; Robert H. Robinson; Samuel Kurlandsky

[57] ABSTRACT

A clip-on attachment member is disclosed characterized by a portion of one leg of the member being bent slightly out of the plane of the rest of the leg, thereby permitting that leg of the member to be clipped to a hollow structural member to facilitate attachment thereto.

2 Claims, 6 Drawing Figures

CLIP-ON ATTACHMENT MEMBERS FOR STRUCTURAL STEEL JOISTS

BACKGROUND OF THE INVENTION

1. Field of the Invention

This invention relates to a clip-on member for use in attaching hollow structural members perpendicular to one another. The clip-on member is characterized by having a portion of the leg of the member set out of the plane of the rest of the leg. The clip-on member can be one of a number of embodiments including angle members and hangers.

2. Description of the Prior Art

Various types of hanger devices exist for attaching one structural member perpendicular to another. When the structural members are hollow, such as the C-shaped joists and hollow joists and having a rectangular cross-section, a still greater number of attachment members are available. Generally, these attachment members have taken only a few basic forms. They can be an insert-type design which merely allows the hollow member to rest on the insert, or else they can be a hanger-type attachment device wherein a hanger portion hangs over one member and attaches to the other by side flanges or the like. Hangers can also be of the saddle-type with a hanger hanging over one member and the other member resting in a saddle formed at the bottom of the hanger.

All of these devices share the same deficiencies. They either require more than one person to make the connection or else the connection is severely limited in adaptability over a wide range of joist sizes. For those devices that rely upon the hollow joist encircling the support member, centering of the attachment device is impossible unless a different size device is used for each size of joist. The same impediment exists with regards to the saddle-type hangers which can accommodate only one size of joist per hanger. Equally deficient are those hangers which require one person to hold the hanger in its exact attachment relationship to the members while another person does the actual attaching. The new attachment device of this invention provides an attachment member that can be adapted to any size joist, can be centered readily to accommodate any type of attachment, and can be installed by one person without any inconvenience. This new device overcomes all of the deficiencies ascribed to prior known devices.

SUMMARY OF THE INVENTION

It is an object of this invention to provide an attachment member for attaching one hollow structural member perpendicular to another.

It is another object of this invention to provide an attachment member for attaching one hollow structural member perpendicular to another and which provides for adaptability of various size structural members as well as adaptability to centering and aligning the structural members.

It is still another object of this invention to provide an attachment device for attaching one hollow structural member perpendicular to another with only one person required to accomplish the complete installation.

The objects of this invention are accomplished by a clip-on angle member for use in attaching one hollow structural member perpendicular to another, said clip-on angle member comprising an angle member with one leg of the angle member slightly bent out of the plane of the rest of the leg, thereby permitting that leg of the angle member to be clipped to said one structural member.

The objects of this invention are additionally accomplished in an angle member for use in attaching one hollow structural member perpendicular to another by the improvement comprising a split in one of the legs of the angle member and the dislocation of a portion of the split leg slightly out of the plane of the rest of the leg, thereby permitting that leg of the angle member to be clipped to said one structural member.

The objects of this invention are further accomplished by a clip-on hanger for use in mounting hollow metal joists perpendicular to headers and the like by attaching side flanges to the joist, said clip-on hanger having a portion of one of the side flanges slightly split out of the plane of the rest of the side flange, thereby permitting that side flange to be clipped to said hollow metal joist.

Specifically, this invention comprises an angle member for attaching a hollow structural member perpendicular to another with a leg or flange of the attachment member having a portion thereof set off or bent slightly out of the plane of the rest of the leg or flange in order that a portion of the leg may be inserted into the hollow structural member while the remaining portion of the leg is engaged about the outer portion of the structural member causing the clip-on member to clip to the structural member and stay in place while it is being attached to the other structural member. The offset leg may encompass many embodiments, but is of particular importance where the attachment member is merely an angle with the clip-on feature on one leg thereof. Also of importance is the embodiment wherein the clip-on feature is one leg of a hanger commonly used for hanging onto one structural member which is being attached to another structural member. Although simple in its design, this invention provides an inexpensive attachment device for use in attaching structural members with a wide range of design features and seeking a wide range of attachment design. As such, this device constitutes an exceptional advance in the method of assembly of hollow structural construction members.

BRIEF DESCRIPTION OF THE DRAWINGS

This invention may be more fully described by, but is not limited to the included drawings wherein.

DESCRIPTION OF THE PREFERRED EMBODIMENTS

Figure 1:
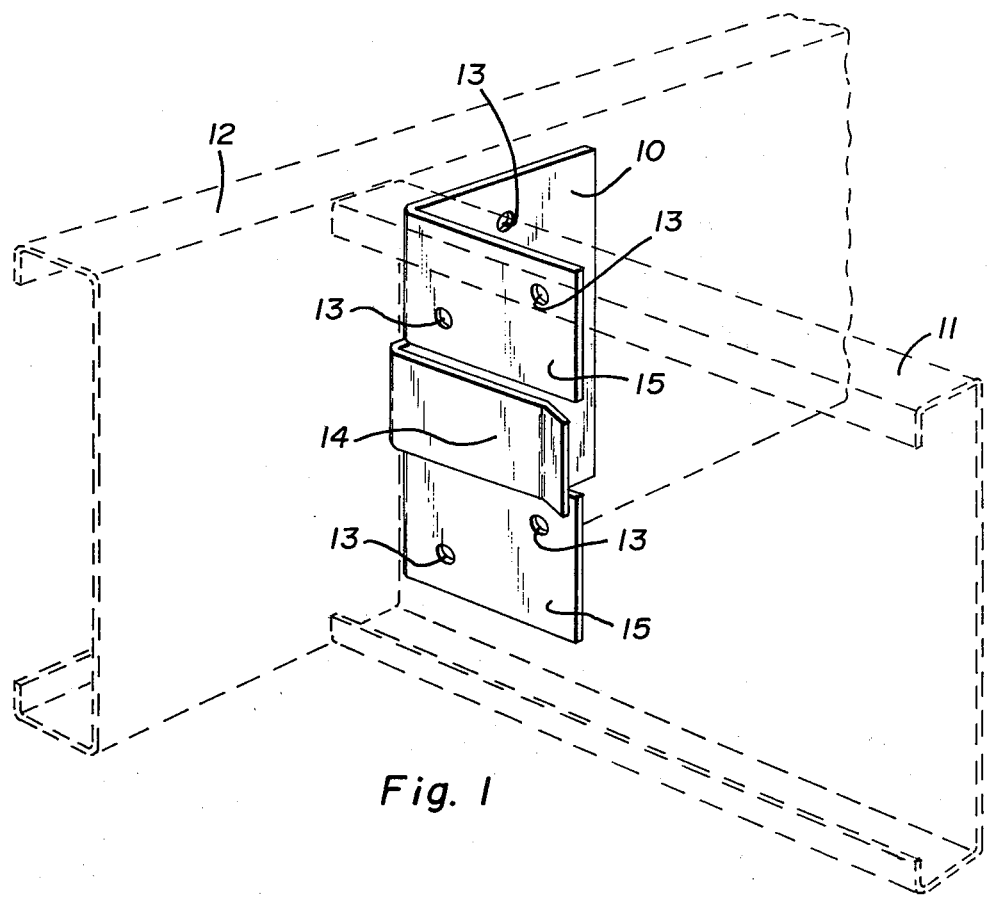
FIG. 1 is a perspective view of one embodiment of the clip device of this invention with the structural members in phantom.

In the drawings, the numeral 10 refers to the angle embodiment of the attachment device of this invention used for holding a joist 11, shown in phantom, perpendicular to a header 12 or the like, also shown in phantom. The attachment device may be attached to the joist and header by any standard type of attachment, such as a screw, through holes 13. A central portion 14 of leg 15 is bent slightly out of the plane of the remainder of the leg in order that it may clip on the joist. It must be noted that this bending out of a central portion of the leg must be accomplished in such a manner that the distance between the portion of the leg that is bent out of the plane of the remaining portion of the leg and the remaining portion of the leg must be less than that distance of the thickness of the joist in order for the clip to effectively clip onto the joist. It must also be noted that the portion of the leg bent out of the plane of the rest of the leg must not be exclusively a terminal (end) portion, that is, it must be a central portion, i.e., between the ends of the leg, in order to have a clipping action.

Figure 4:
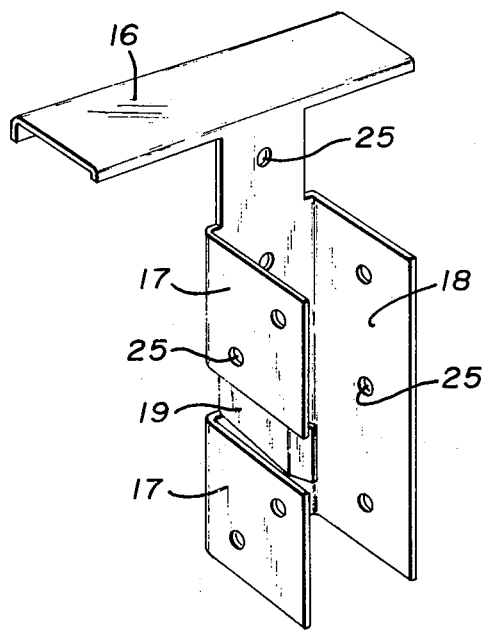
FIG. 4 is a perspective view of an alternative embodiment of the clip-on device of this invention.

FIG. 4 shows still a further embodiment of this invention for use with hollow members having a rectangular cross-section. In the embodiment shown in FIG. 4, a hanger 16 is hung over a header, not shown, and side flanges 17 and 18 are generally used to hang the joist. If the joist is C-shaped, the offset 19 of one side flange is used to make that side flange a clip which can clip onto the joist and the other side flange is an unneeded appendage. In such an application, the outer side flange 18 is independent and not attached to the joist.

Figure 5:
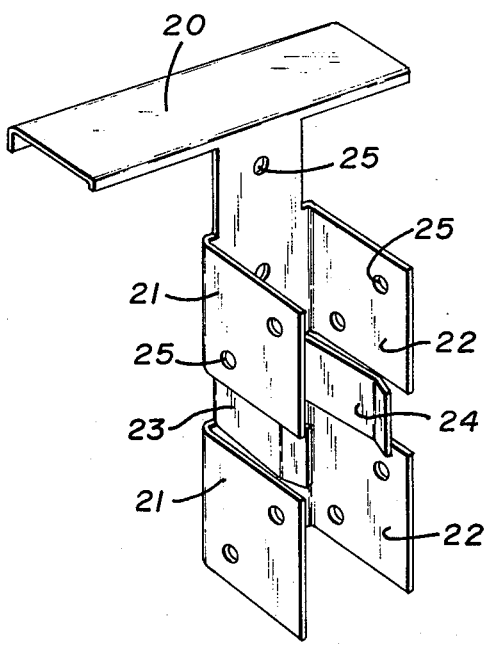
FIG. 5 is a perspective view of another alternative embodiment of the clip-on device of this invention.

In still another embodiment of this invention, as shown in FIG. 5, a hanger 20 is used for hanging over a header, not shown. The hanger has two side flanges, 21 and 22, with offset center portions 23 and 24, respectively. The hanger is particularly useful in hanging a hollow rectangular shaped joist, with the side flanges each engaging a side of the joist, or the hanger may be used with a C-shaped joist to give flexibility in direction of the open part of the C of the joist. In either of the hangers of FIGS. 4 and 5, the attachment to the headers and joist may be made through conventional attachment devices, such as a screw projecting through holes 25.

Figure 2:
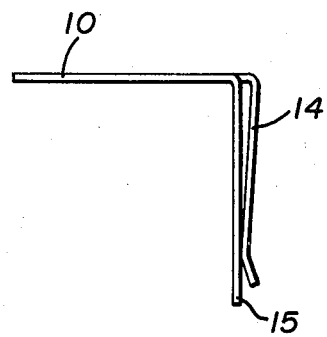
FIG. 2 is a top view of the clip-on device of this invention.
Figure 3:
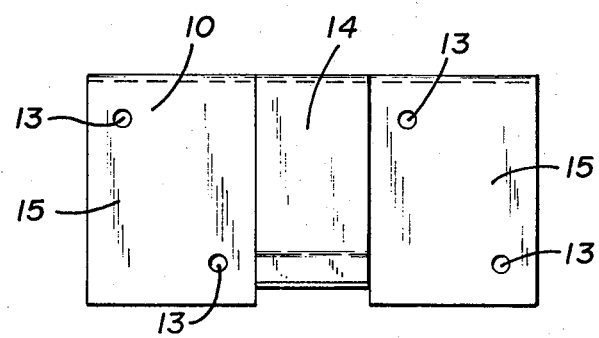
FIG. 3 is a front view of the clip-on device of this invention.
Figure 6:
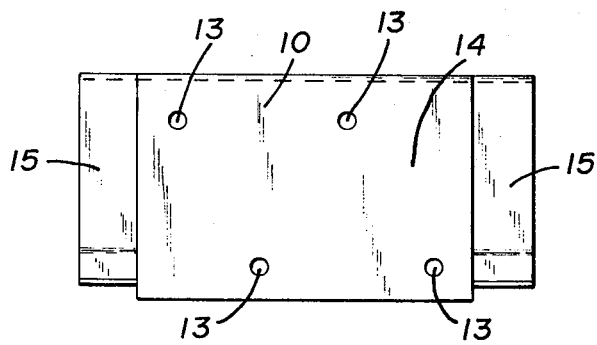
FIG. 6 is a front view of the embodiment of the clip-on device shown in FIG. 2.

FIG. 6 illustrates another embodiment of the invention similar to the one in FIG. 2 but having the major portion of the side or leg member offset as contrasted to the one in FIG. 2 which has a minor portion of the leg offset.

In any of the embodiments of this invention, it is preferable to first bend the displaced portion of the leg outward, then to bend it back down to the plane of the original portion, and then to bend it slightly outward to facilitate the insertion of the joist member. The outward bending should be a distance at least as great as the thickness of the joint being engaged.

FIG. 1 of the drawings illustrates the preferred embodiment of this invention. This embodiment is an angle member with a small central portion of one leg of the angle member being displaced slightly out of the plane of the rest of that leg in order to engage a structural member.

In installation, the angle member of this invention is clipped onto the joist while the joist is being held by the installer. At that point the angle member may or may not be attached to the joist depending upon the desires of the installer. Next, the angle member is attached to the header or other member to place the structural members in the desired relationship one to another. Next, the attachment member is attached to all of the structural members.

The obvious advantage of this attachment member is that it does not require the installer to hold the joist with one hand and the clip with another while a second installer attaches the attachment member to the header. In installation, the clip-on mechanism enables the complete installation by a person requiring the holding with one hand only while the drilling or tapping and attachment is accomplished with the other hand. Although simple and expedient, this new and novel attachment device permits exceptional labor savings and cost reduction.

Having fully described this new and novel invention the following is claimed:

1. A clip-on hanger for use in mounting hollow metal joists perpendicular to headers and the like, said clip-on hanger comprising a U-shaped top support having a depending back plate depending from a portion thereof, said depending back plate having at opposing sides thereof perpendicularly outwardly extending side flanges with at least one of said side flanges having a central portion thereof slightly bent out of the plane of the remainder of the side flange thereby permitting the hanger to be hung over one structural member while the side flanges are clipped to another structural member for attachment thereto.

2. A clip-on hanger as in claim 1 wherein both side flanges have a central portion thereof slightly bent out of the plane of the remainder of the side flange.

* * * * *